(12) United States Patent
Kaivani

(10) Patent No.: US 9,646,175 B2
(45) Date of Patent: May 9, 2017

(54) TWO-WAY PARITY ERROR DETECTION FOR ADVANCED ENCRYPTION STANDARD ENGINES

(71) Applicant: Synopsys, Inc., Mountain View, CA (US)

(72) Inventor: Amir Kaivani, Saskatoon (CA)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 14/554,772

(22) Filed: Nov. 26, 2014

(65) Prior Publication Data

US 2016/0148020 A1 May 26, 2016

(51) Int. Cl.
| | |
|---|---|
| *H04K 1/00* | (2006.01) |
| *G06F 21/72* | (2013.01) |
| *H04L 9/06* | (2006.01) |
| *G09C 1/00* | (2006.01) |

(Continued)

(52) U.S. Cl.
CPC ............. *G06F 21/72* (2013.01); *G09C 1/00* (2013.01); *H04L 9/003* (2013.01); *H04L 9/004* (2013.01); *H04L 9/0631* (2013.01); *H03M 13/098* (2013.01); *H04L 2209/043* (2013.01); *H04L 2209/12* (2013.01); *H04L 2209/26* (2013.01)

(58) Field of Classification Search
CPC ... G01R 31/3167; G06F 11/1004; G06F 8/30; H03M 13/093; H04L 1/1607; H04L 1/1614; H04L 1/1628; H04L 29/06; H04W 28/06
USPC ............................................................ 380/2
See application file for complete search history.

(56) References Cited

U.S. PATENT DOCUMENTS

| 8,275,128 B2 * | 9/2012 | Nakagoe .......... G11B 20/00086 380/28 |
| 2013/0145177 A1 * | 6/2013 | Cordella ............. G06F 12/1408 713/193 |

FOREIGN PATENT DOCUMENTS

WO 2016/083873 6/2016

OTHER PUBLICATIONS

Form PCT/ISA/220, PCT/IB2014/066485, "Notification of Transmittal of the International Search Report and the Written Opinion of the International Searching Authority, or the Declaration", 1 page; Form PCT/ISA/237, PCT/IB2014/066485, "Written Opinion of the International Searching Authority", 4 pages; Form PCT/ISA/210, PCT/IB2014/066485, "International Search Report", 3 pages. Date of Mailing May 29, 2015.

(Continued)

*Primary Examiner* — Kambiz Zand
*Assistant Examiner* — Abiy Getachew
(74) *Attorney, Agent, or Firm* — Jaquez Land Greenhaus LLP; Bruce Greenhaus, Esq.

(57) ABSTRACT

A method of improving the operation of a processor executing a cryptographic process, by automatically detecting faults during both encryption and decryption operations by the cryptographic process, comprises segmenting the data to be encrypted and encrypting the data segments using a complex non-linear algorithm that can lead to faults; computing an output parity bit from a selected step of the algorithm for a selected data segment, based on the input value of that segment; comparing the actual output parity bit of the selected segment with the computed output parity bit for that segment; and determining whether a fault exists, based on whether the actual output parity bit matches the computed output parity bit for the selected segment.

2 Claims, 2 Drawing Sheets

(51) Int. Cl.
*H04L 9/00* (2006.01)
*H03M 13/09* (2006.01)

(56) References Cited

OTHER PUBLICATIONS

Nicolaidis, "Carry Checking/Parity Prediction Adders and ALUs", IEEE Transactions on Very Large Scale Integration (VLSI) Systems, vol. 11, No. 1, Feb. 1, 2003 (8 pages).

* cited by examiner

TWO-WAY PARITY ERROR DETECTION FOR ADVANCED ENCRYPTION STANDARD ENGINES

FIELD OF THE INVENTION

The present disclosure relates to fault detection in encryption systems.

BRIEF SUMMARY

In accordance with one embodiment, a method is provided for improving the operation of a processor executing a cryptographic process by automatically detecting faults during both encryption and decryption operations by the cryptographic process. The method comprises segmenting the data to be encrypted and encrypting the data segments using a complex non-linear algorithm that can lead to faults; computing an output parity bit from a selected step of the algorithm for a selected data segment, based on the input value of that segment; comparing the actual output parity bit of the selected segment with the computed output parity bit for that segment; and determining whether a fault exists, based on whether the actual output parity bit matches the computed output parity bit for the selected segment. The data segments may be encrypted and decrypted, and the computing, comparing and determining operations are executed during both encrypting and decrypting. The data is preferably encrypted and decrypted using the Advanced Encryption Standard specification.

In one implementation, the method comprises computing an input parity bit for the selected data segment input to the selected step of the algorithm, based on the output value of that segment from the selected step of the algorithm; comparing the actual input parity bit of the selected segment input to the selected step of the algorithm, with the computed input parity bit for that data segment, and determining whether a fault exists, based on whether the actual input parity bit matches the computed input parity bit for the selected segment.

In a preferred implementation, the method computes an output parity bit from multiple steps of the algorithm; compares the actual output parity bit of each of the multiple steps with the computed output parity bit for that step; and determines whether a fault exists, based on whether the actual output parity bit matches the computed output parity bit for each of the multiple steps.

In another implementation, the method comprises segmenting the data to be encrypted and encrypting the data segments using a complex non-linear algorithm that can lead to faults; computing an output parity bit from a data segment processed by the algorithm, based on the input value of that segment before being processed by the algorithm; comparing the actual output parity bit of the data segment with the computed output parity bit for that segment, and determining whether a fault exists, based on whether the actual output parity bit matches the computed output parity bit for the selected segment. In one implementation, the data segments are encrypted and decrypted, and the computing, comparing and determining operations are executed for each data segment that is encrypted or decrypted.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

Figure 1:
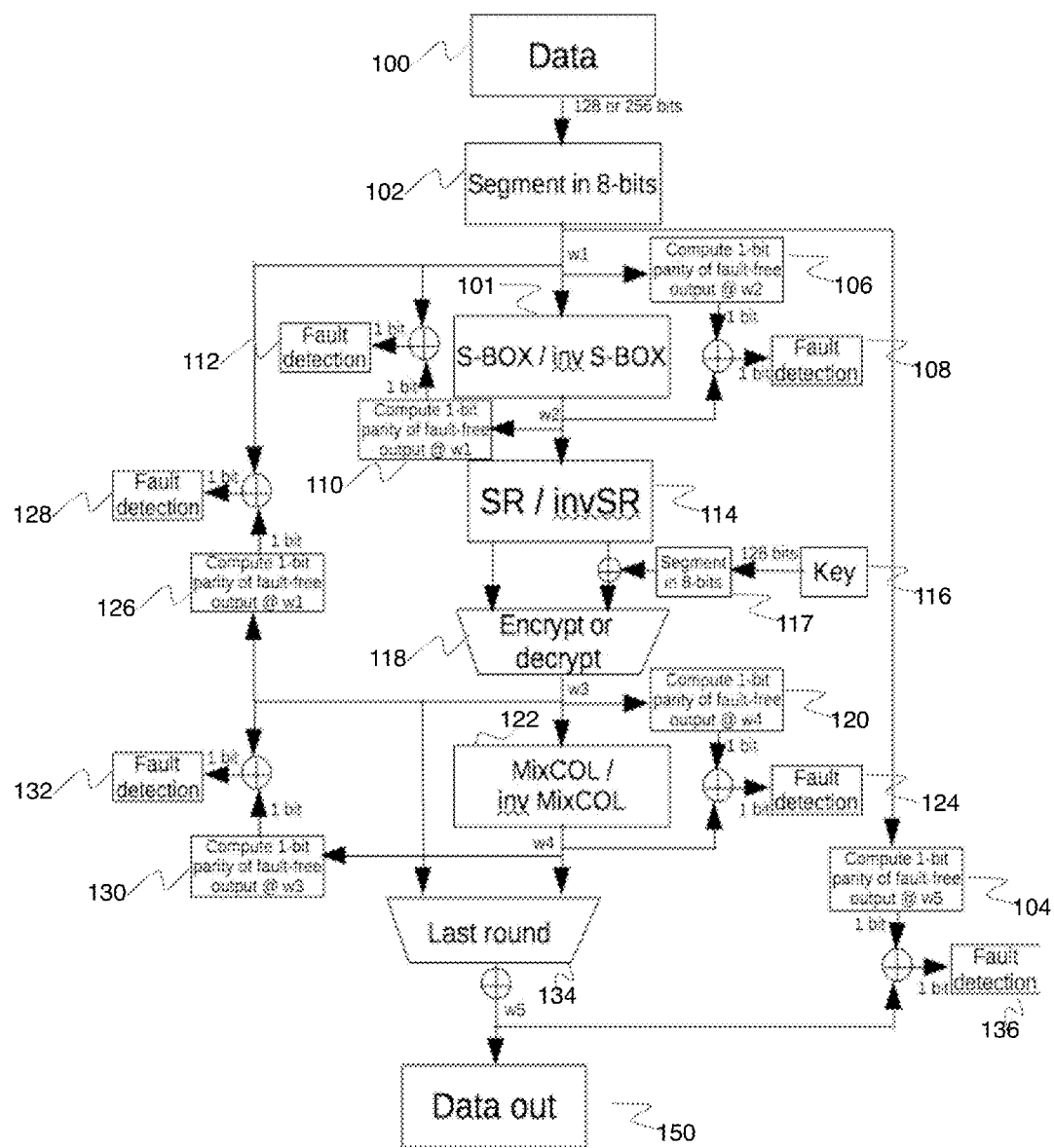
FIG. 1 is a diagram of an embodiment of an encryption engine using two-way parity fault detection.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

REFERENCES

[1] Federal Information Processing Standards (FIPS). *Advanced Encryption Standard (AES)*. Publication 197. November 2001.

DETAILED DESCRIPTION

The Advanced Encryption Standard (AES) [1] executes a complex non-linear algorithm which can lead to faults. In order to detect faults, the whole AES engine can be duplicated and executed twice in parallel. Results from both are compared to detect faults. However, this approach leads to more than 100% overhead, which for high-throughput engines is a large price to pay.

Using single parity to detect faults in AES engines can be considered as a solution to reduce the cost. In this case, the parity of the fault-free output is computed based on the input data and is compared with the parity generated from the output data. Only uneven bit errors can be detected. However, given the fact that errors in an AES engine spread quickly throughout the data and the control blocks, they are generally not detectable by single parity fault detection leading to unacceptable fault coverage.

There is a need for a low cost fault detection method with reliable fault coverage.

In this embodiment, checkpoints are incorporated throughout the data blocks to verify the parity and prevent the errors from spreading.

A two-way parity fault detector is applied to the AES datapath (in both encryption and decryption paths), while the control logic (e.g., finite state machine, multiplexors and registers) are optionally covered via duplication.

Referring to FIG. 1, the round cipher module is protected using several fault detection steps. The S-box and inv S-box process 101 and the MixColumns and Inv MixColumns process 122 are each covered by a two-way parity fault detection with 1 parity bit per 8 bits. The output parity bit (1 parity bit per 8-bits of data) is computed based on the input value and compared with the actual output parity bit.

Data 100 of size 128-bits or 256-bits is segmented into 8-bit segments in step 102. Prior to performing the S-box/inv S-box process 101, a 1-bit parity of the fault-free output on w2 is computed based on the input w1 on the segments in step 106. This computed parity is compared with the actual parity of the output of the S-box/inv S-box process 101, and if the actual parity does not match the computed parity, a fault is detected at step 108. At the same time, based on the segment output from the segment S-box/inv S-box process 101, a 1-bit parity of the fault-free input packet is computed based on w2 at step 110 and compared with the input segment parity to detect a fault at step 112.

The ShiftRows/inv ShiftRows process 114 is performed if no faults are detected, then the key 116 is segmented 117 and combined to perform the encrypt/decrypt process 118.

Optionally, for higher fault coverage, parity for the encrypted/decrypted segments from the encrypt/decrypt process is computed at step 120 prior to input into the MixColumn/invMixColumn process 122. Prior to performing the MixColumn/invMixColumn process 122, a 1-bit parity of the fault-free output on w4 is computed based on the input w3 on the segments in step 120. This computed parity is compared with the actual parity of the output of the MixColumn/invMixColumn process 122, and if the actual parity does not match the computed parity, a fault is detected at step 124. At the same time, based on the segment output from the MixColumn/invMixColumn process 122, a 1-bit parity of the fault-free input packet is computed based on w4 at step 130 and compared with the input segment parity to detect a fault at step 132.

Furthermore, based on the encrypted/decrypted segments from the encrypt/decrypt process, parity on the expected input segment can be computed at step 126 and compared with the original input segment for fault detection at step 128.

Parity of the initial segment is compared with the output segments after the last round 134 for fault detection at step 136 prior to output of the data 150.

Figure 2:
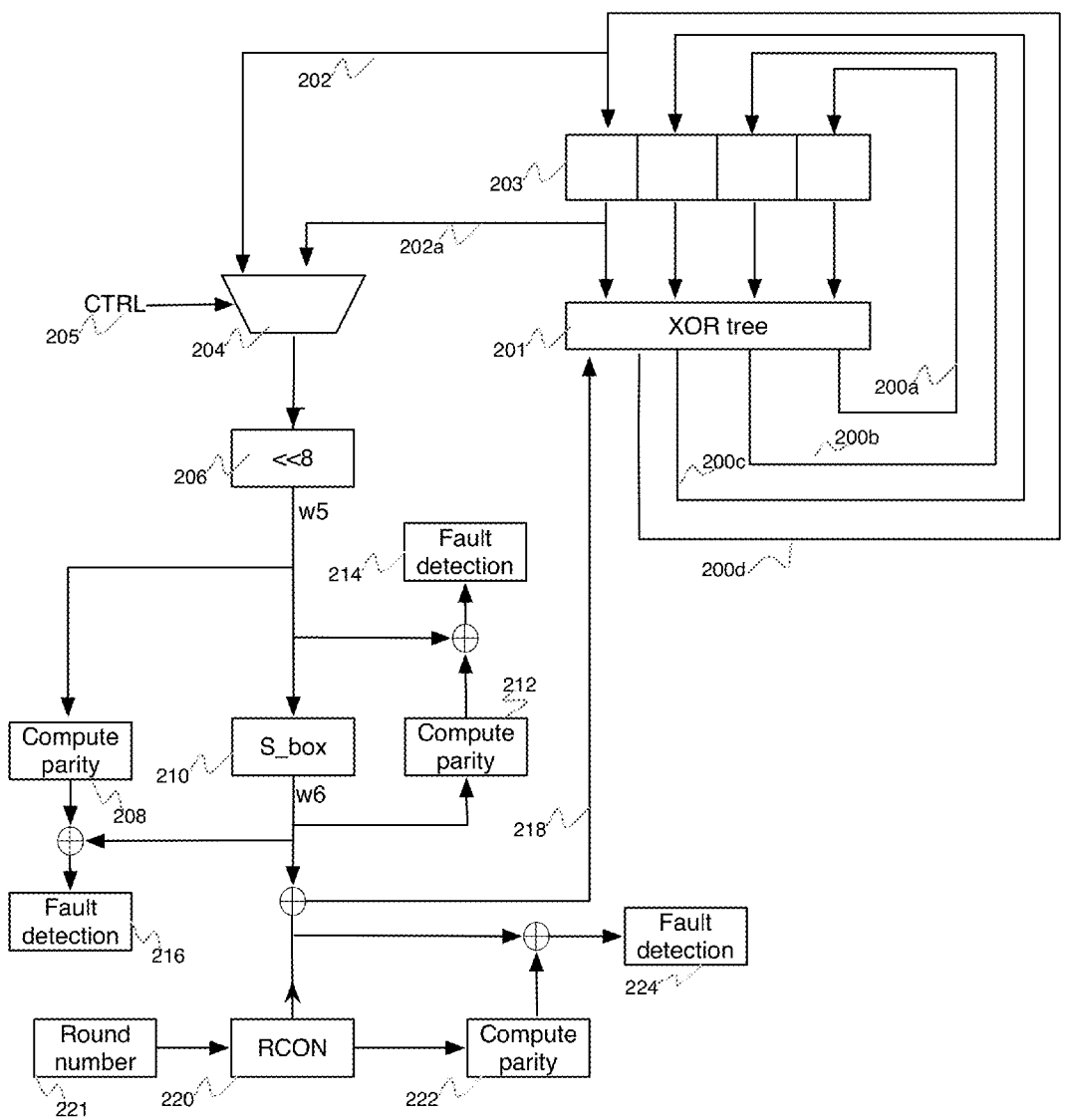
FIG. 2 is a diagram of an embodiment of the key expansion engine using two-way parity fault detection.

An example of a protected key expansion module is shown in FIG. 2. A 128-bit key is stored in registers 203. The key is XORed at step 201, and 4 segments of 32-bits 200a . . . 200d are re-circulated to the registers 203 for the next round. The round number 221 is input to the round constant process (RCON) 220. Parity on the output of the RCON process based on the expected round number is compared to the parity of the RCON output for fault detection at step 224.

A control function 205 selects either the first 32-bit segment of the new round key or the previous round key depending upon whether it is performing decryption or encryption. The bits of the selected segment are shifted by 8 to the left. Prior to performing the S_box process 210, a 1-bit parity of the fault-free output on w7 is computed based on the input w6 on the segments in step 208. This computed parity is compared with the actual parity of the output of S_box process 210, and if the actual parity does not match the computed parity, a fault is detected at step 216. At the same time, based on the segment output from the S_box process 210, a 1-bit parity of the fault-free input packet is computed based on w7 at step 212 and compared with the input segment parity to detect a fault at step 214.

A 1-bit parity check 222 can be optionally added to the RCON function 220 to detect faults in RCON block 224.

The control logic and multiplexors can be optionally protected using duplication.

When a fault is detected 108, 112, 124, 128, 132, 136 the process can be halted and the most recent encryption/decryption round restarted from the beginning to avoid wasting further cycles on ciphering segments with errors. Statistics on the frequency of detected faults and the step involved in the fault can be optionally gathered and used to manage the processor.

Conventional duplication method provides 100% fault coverage with greater than 100% area overhead. The two-way parity fault detection embodiment described provides for 99.9% fault detection coverage with 41% area overhead.

Although the algorithms described above including those with reference to the foregoing flow charts have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. An encryption engine using two-way parity fault detection, the encryption engine including:
    a) an S-box/invert S-box (SBISB) processor implemented by at least one hardware device, having an input and an output;
    b) a first one-bit parity computer having an input and an output, the input coupled to the input of the SBISB processor, the first one-bit parity computer configured to compute the one-bit parity of the output of the SBISB processor based on the input to the SBISB processor;

c) a first parity comparator implemented by at least one hardware device, having a first and second input and an output, the first input coupled to the output of the first one-bit parity computer and the second input coupled to the output of the SBISB processor, the first parity comparator configured to compare the output of the first one-bit parity computer to the actual parity of the output of the SBISB processor;

d) a second one-bit parity computer having an input and an output, the input coupled to the output of the SBISB processor, the second one-bit parity computer configured to compute the one-bit parity of the input to the SBISB processor based on the output of the SBISB processor; and e) a second parity comparator implemented by at least one hardware device, having a first and second input, the first input coupled to the output of the second one-bit parity computer and the second input coupled to the input of the SBISB processor, the second parity comparator configured to compare the output of the second one-bit parity computer to the actual parity of the input of the SBISB; the encryption engine, further including, f) a shift rows/invert shift rows (SRISR) processor having an input coupled to the output of the SBISB processor and having an output;

g) an encrypt/decrypt processor having an input coupled to the output of the SRISR processor and having an output;

h) a mix column/invert mix column MCIMC processor having an input coupled to the output of the encrypt/decrypt processor and having an output;

i) a third one-bit parity computer having an input and an output, the input coupled to the input of the MCIMC processor, the third one-bit parity computer configured to compute the one-bit parity of the output of the MCIMC processor based on the input to the MCIMC processor;

j) a third parity comparator having a first and second input and an output, the first input coupled to the output of the third one-bit parity computer and the second input coupled to the output of the MCIMC processor, the third parity comparator configured to compare the output of the third one-bit parity computer to the actual parity of the output of the MCIMC processor;

k) a fourth one-bit parity computer having an input and an output, the input coupled to the output of the MCIMC processor, the fourth one-bit parity computer configured to compute the one-bit parity of the input to the MCIMC processor based on the output of the MCIMC processor; and l) a fourth parity comparator having a first and second input, the first input coupled to the output of the fourth one-bit parity computer and the second input coupled to the input of the MCIMC processor, the fourth parity comparator configured to compare the output of the fourth one-bit parity computer to the actual parity of the input of the MCIMC processor.

2. The encryption engine of claim 1, further including:

a) a fifth one-bit parity computer having an input and an output, the input coupled to the input of the MCIMC processor, the fifth one-bit parity computer configured to compute the one-bit parity of the input to the SBISB processor based on the input to the MCIMC processor; and b) a fifth parity comparator implemented by at least one hardware device, having a first and second input, the first input coupled to the output of the fifth one-bit parity computer and the second input coupled to the input to the SBISB processor, the fifth parity comparator configured to compare the output of the fifth one-bit parity computer to the actual parity of the input of the SBISB processor.

* * * * *